(12) United States Patent
Cao (10) Patent No.: US 11,292,547 B2
(45) Date of Patent: Apr. 5, 2022

(54) SELF-BALANCING VEHICLE

(71) Applicant: GOLABS INC., Carrollton, TX (US)

(72) Inventor: Matao Cao, Carrollton, TX (US)

(73) Assignee: GOLABS INC., Carrollton, TX (US)

( * ) Notice: Subject to any disclaimer, the term of this patent is extended or adjusted under 35 U.S.C. 154(b) by 80 days.

(21) Appl. No.: 16/926,066

(22) Filed: Jul. 10, 2020

(65) Prior Publication Data

US 2022/0009583 A1 Jan. 13, 2022

(51) Int. Cl.
*B62K 11/00* (2006.01)
*B62K 11/02* (2006.01)
*B62J 43/28* (2020.01)
*B62J 45/415* (2020.01)

(52) U.S. Cl.
CPC ............ *B62K 11/007* (2016.11); *B62J 43/28* (2020.02); *B62J 45/415* (2020.02); *B62K 11/02* (2013.01); *B62K 2204/00* (2013.01)

(58) Field of Classification Search
CPC ............. B62J 43/28; B62J 43/10; B62J 43/16
USPC ......................................................... 180/218
See application file for complete search history.

(56) References Cited

U.S. PATENT DOCUMENTS

| 10,800,472 B2* | 10/2020 | Shang ................. B62K 11/007 |
| 2019/0337585 A1* | 11/2019 | Ying ........................ B62K 3/00 |
| 2020/0262504 A1* | 8/2020 | Chen .................... A63C 17/014 |

* cited by examiner

*Primary Examiner* — Kevin Hurley
*Assistant Examiner* — Hosam Shabara
(74) *Attorney, Agent, or Firm* — Slater Matsil, LLP (57) ABSTRACT

A system includes a first wheel connected to a left vehicle body comprising a first upper case and a first lower case, a second wheel connected to a right vehicle body comprising a second upper case and a second lower case, a rotating connection member between the left vehicle body and the right vehicle body, a plurality of batteries placed inside the rotating connection member, and a controller on at least one of the first upper case and the second upper case.

20 Claims, 7 Drawing Sheets

SELF-BALANCING VEHICLE

TECHNICAL FIELD

The present invention relates to the technical field of electric vehicles, in particular to a self-balancing vehicle.

BACKGROUND

The self-balancing vehicle is a high-tech intelligent product that uses the principle of dynamic balancing to control the forward and backward motions of the self-balancing vehicle. It uses the gyroscope and acceleration sensors inside the vehicle body to detect changes in the posture of the vehicle body, and uses the servo control system to drive the motor to adjust accordingly. As a result, it can maintain the balance of the system. With the tilt of the user's body, the speed and direction of the self-balancing vehicle can be controlled. It is a new type of environmentally friendly products used by modern people for travel and leisure. At present, the self-balancing vehicle can be divided into two categories, namely single-wheeled self-balancing vehicles and two-wheeled self-balancing vehicles. Due to some advantageous features such as high stability and easy driving, the self-balancing vehicle is especially popular with consumers.

In the existing self-balancing vehicles, on the one hand, the whole vehicle is composed of a three-layer structure comprising a surface case, an aluminum part and a bottom case. The aluminum part is an aluminum die-casting part, which are a type of pressure-cast parts. Various parts and components are installed on the aluminum part. This brings additional process steps. As a result having the additional steps, the cost is high. On the other hand, the power supply and the rotating connection member are installed separately. As a result, the utilization rate of the internal space of the balancing vehicle is not high.

SUMMARY OF THE INVENTION

These and other problems are generally solved or circumvented, and technical advantages are generally achieved, by preferred embodiments of the present invention which provide a self-balancing vehicle.

The various embodiments of the present disclosure provide a self-balancing vehicle with a simple structure and a reasonable design. The self-balancing vehicle has an upper case and a lower case. The upper case and the lower case are connected by a rotating connection member, and the battery is installed inside the rotating connection member. A controller is installed on the upper case. As a result, the aluminum structure can be eliminated. Removing the aluminum structure helps to solve various problems such as complicated procedures, high cost and low space utilization.

The self-balancing vehicle includes a vehicle body and driving wheels on the vehicle body. The vehicle body includes a left vehicle body and a right vehicle body. The left vehicle body and the right vehicle body are connected by the rotating connection member. The battery is inside the rotating connection member. The left and right bodies respectively include an upper case and a lower case. The controller is connected to the battery. The controller is installed on the upper case.

Furthermore, the left and right ends of the rotating connecting member are sleeved with rotating brackets. The rotating brackets are fixed to the left vehicle body and the right vehicle body by fixing members.

Furthermore, a first pedal is installed on the left side of the upper case and a second pedal is installed on the right side of the upper case. Sensing devices are disposed below the first pedal and the second pedal.

Furthermore, the sensing device includes a trigger element and a photoelectric switch. The trigger element is connected to the pedal. The photoelectric switch is connected to the controller. The photoelectric switch comprises an opening that cooperates with the trigger element.

Furthermore, a return spring is sleeved on the trigger element.

Furthermore, at least one end of the rotary connecting member is sleeved with a lubricated bearing. The lubricated bearing is interposed between the rotating bracket and the rotating connection member. The lubricated bearing is fixed to the rotating bracket. The lubricated bearing can rotate relative to the rotating connection member.

Furthermore, one end of the rotating connection member is fixedly connected with the rotating bracket.

Furthermore, the rotating connection member is provided with a plurality of shaft grooves. A plurality of circlips for limiting the position is installed on the shaft grooves.

Furthermore, the controller is connected with a wheel motor and a lamp. The wheel motor includes a motor shaft. The motor shaft is respectively fixed on the left and right sides of the vehicle body through a motor shaft pressure plate.

In accordance with an embodiment, a system comprises a first wheel connected to a left vehicle body comprising a first upper case and a first lower case, a second wheel connected to a right vehicle body comprising a second upper case and a second lower case, a rotating connection member between the left vehicle body and the right vehicle body, a plurality of batteries placed inside the rotating connection member, and a controller on at least one of the first upper case and the second upper case.

In accordance with another embodiment, a system comprises a first wheel and a second wheel connected to a left vehicle body and a right vehicle body of a vehicle, respectively, a rotating connection member between the left vehicle body and the right vehicle body, wherein at least one terminal of the rotating connection member is equipped with a lubricated bearing, and one terminal of the rotating connection member is fixedly connected with a rotating bracket, a battery placed inside the rotating connection member, and a controller configured to drive the first wheel and the second wheel.

In accordance with yet another embodiment, a system comprises a first wheel and a second wheel connected to a left vehicle body and a right vehicle body of a vehicle respectively, wherein the left vehicle body comprises a first upper case and a first lower case, and the right vehicle body comprises a second upper case and a second lower case, a rotating connection member between the left vehicle body and the right vehicle body, a battery placed inside the rotating connection member, and a controller installed on at least one of the first upper case and the second upper case.

Various embodiments of the present disclosure have many advantageous features. In comparison with the traditional three-layer structure including a surface case, an aluminum part and a bottom case, the vehicle in this disclosure includes an upper case and a lower case. The upper case and the lower case are connected by a rotating connection member. The battery is installed inside the rotating connection member. The controller is installed on the upper case, thereby eliminating the aluminum part, simplifying the installation structure inside the self-balancing vehicle, improving the space utilization, facilitating the assembly, and greatly reducing various costs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments of the disclosure, and do not limit the scope of the disclosure.

The present disclosure will be described with respect to embodiments in a specific context, a self-balancing vehicle. The embodiments of the disclosure may also be applied, however, to a variety of electric vehicles. Hereinafter, various embodiments will be explained in detail with reference to the accompanying drawings.

Figure 1:
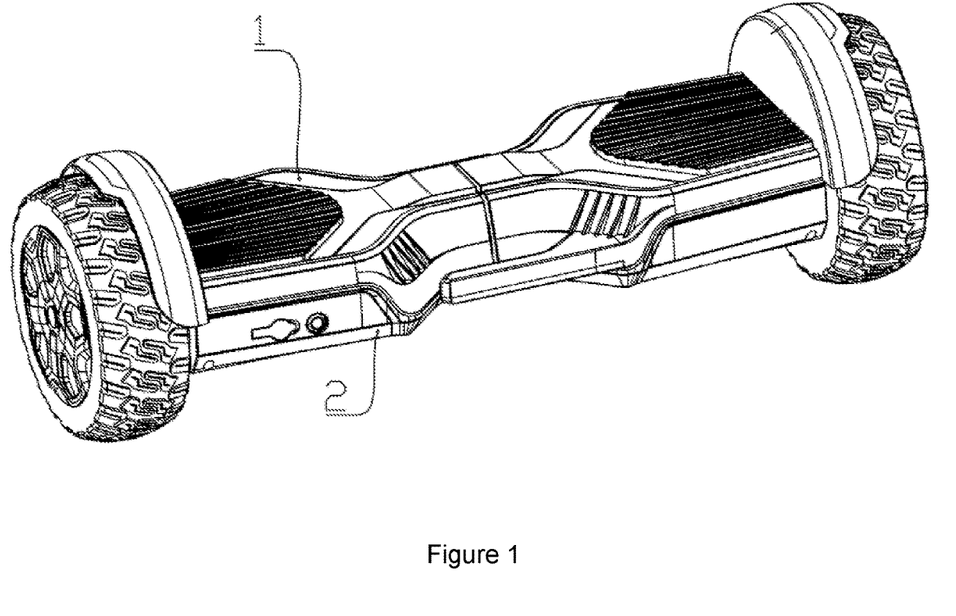
FIG. 1 illustrates a perspective view of a self-balancing vehicle in accordance with various embodiments of the present disclosure.

FIG. 1 illustrates a perspective view of a self-balancing vehicle in accordance with various embodiments of the present disclosure. The self-balancing vehicle includes a vehicle body. The vehicle body includes two driving wheels. The vehicle body further comprises a left vehicle body and a right vehicle body. A rotating connection member (e.g., rotating connection member 3 shown in FIG. 2) is between the left vehicle body and the right vehicle body. The rotating connection member is employed to provide a reliable connection between the left vehicle body and the right vehicle body. A battery or a plurality of batteries (e.g., battery 5 shown in FIG. 2) is placed inside the rotating connection member (not shown but illustrated in FIGS. 5-6). The left vehicle body and the right vehicle body can rotate relative to each other. Both the left vehicle body and the right vehicle body include an upper case 1 and a lower case 2, respectively. A controller (e.g., controller 6 shown in FIG. 2) is connected to the battery. The controller is installed on the upper case 1 (not shown but illustrated in FIG. 2). In comparison with conventional vehicles in the industry, the various embodiments of the present disclosure simplify the vehicle body into a two-layer structure, that is, the upper case 1 and the lower case 2. The aluminum plate has been removed. The process of manufacturing the aluminum plate is tedious. Furthermore, the die-cast process of manufacturing the aluminum plate is costly. Replacing the conventional structure with a structure having the battery insider the rotating connection member and the controller installed on the upper case. Such a structure better utilizes the space, thereby reducing the cost of the self-balancing vehicle.

Figure 2:
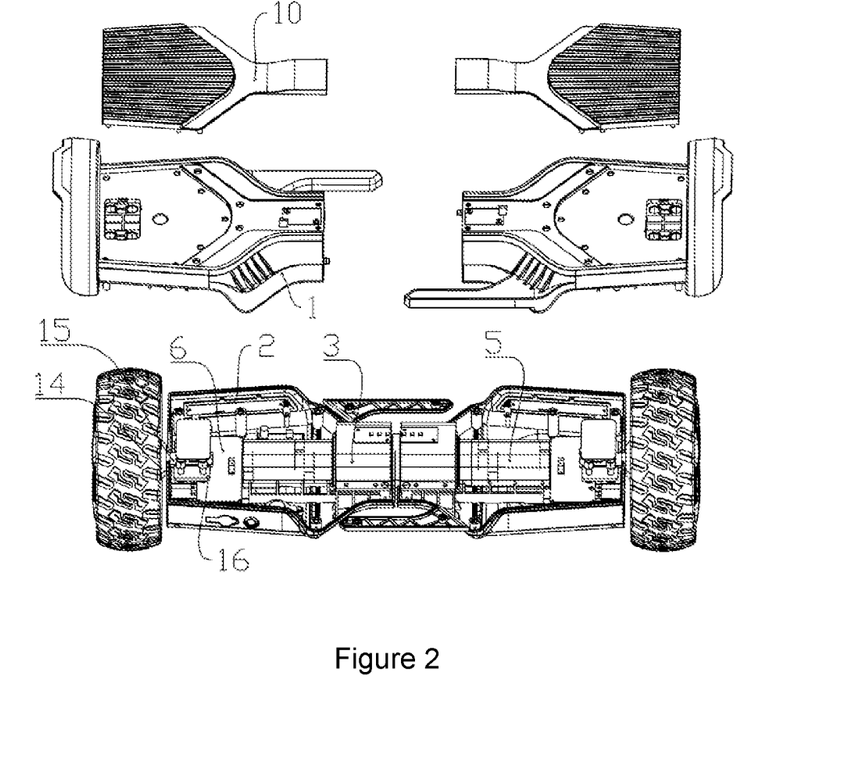
FIG. 2 illustrates an exploded view of the self-balancing vehicle shown in FIG. 1 in accordance with various embodiments of the present disclosure.

FIG. 2 illustrates an exploded view of the self-balancing vehicle shown in FIG. 1 in accordance with various embodiments of the present disclosure. As shown in FIG. 2, the battery 5 is placed inside the rotating connection member 3. The rotating connection member 3 is a rotating part of the self-balancing vehicle. The battery 5 is disposed within the rotating part. Such an arrangement (battery inside the rotating part) can greatly improves the space utilization, reduce the volume flow equilibrium and simplify the installation structure. As a result, the assembly of the self-balancing vehicle is more efficient, and the cost is greatly reduced.

The controller 6 is placed on the upper case 1. The controller 6 is connected to the battery 5. In addition, the controller 6 is connected to the driving wheels. The controller 6 is configured to control the driving wheels. The controller 6 includes a main board and an auxiliary board. The main board of the controller 6 is placed on the left side on the upper case. The auxiliary board of the controller 6 is placed on the right side on the upper case. The pedals 10 generate control signals after external force is applied to the pedals 10. The main board and the auxiliary board of the controller 6 detect rotation signals from the control signals generated by the pedals 10. Based on the rotation signals, the controller 6 controls the driving wheels to generate different wheel speeds. In comparison with the prior art, the space occupied by the controller 6 has been reduced. The controller 6 controls the corresponding wheel motor 14 to drive the corresponding wheel according to the detected rotation signals.

Figure 5:
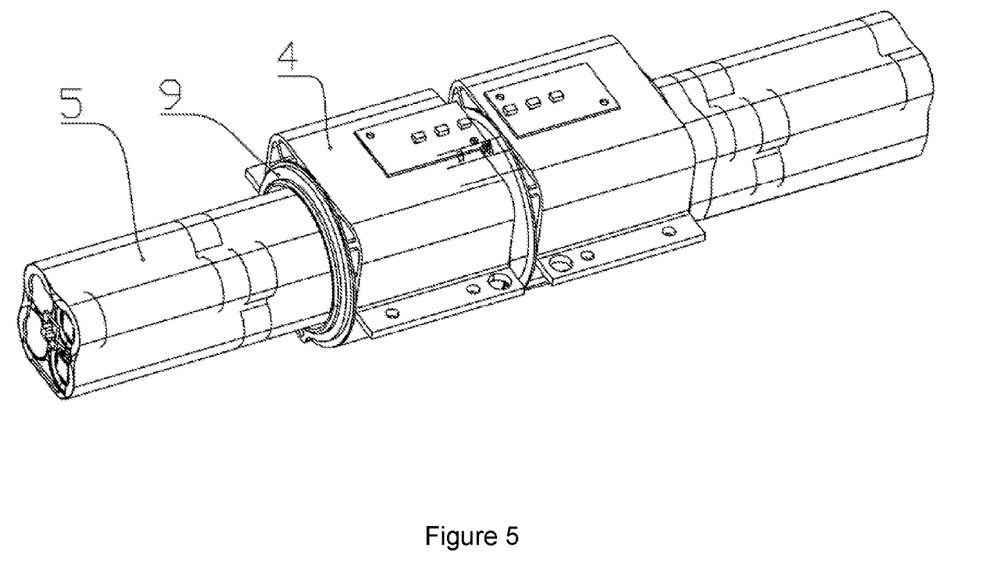
FIG. 5 illustrates a perspective view of the rotating connection member in accordance with various embodiments of the present disclosure.

FIG. 5 illustrates a perspective view of the rotating connection member in accordance with various embodiments of the present disclosure. Rotating brackets 4 are installed on the left side and the right side of the rotating connection member 3 (not shown but illustrated in FIG. 6). The rotating brackets 4 are fixed to the upper case 1 and the lower case 2 through suitable screws. The upper case 1 and the lower case 2 may be made of plastic. Preferably, the thickness of the upper case 1 and the lower case 2 may be increased to ensure that the strength of the upper case 1 and the lower case 2 is not reduced.

Figure 6:
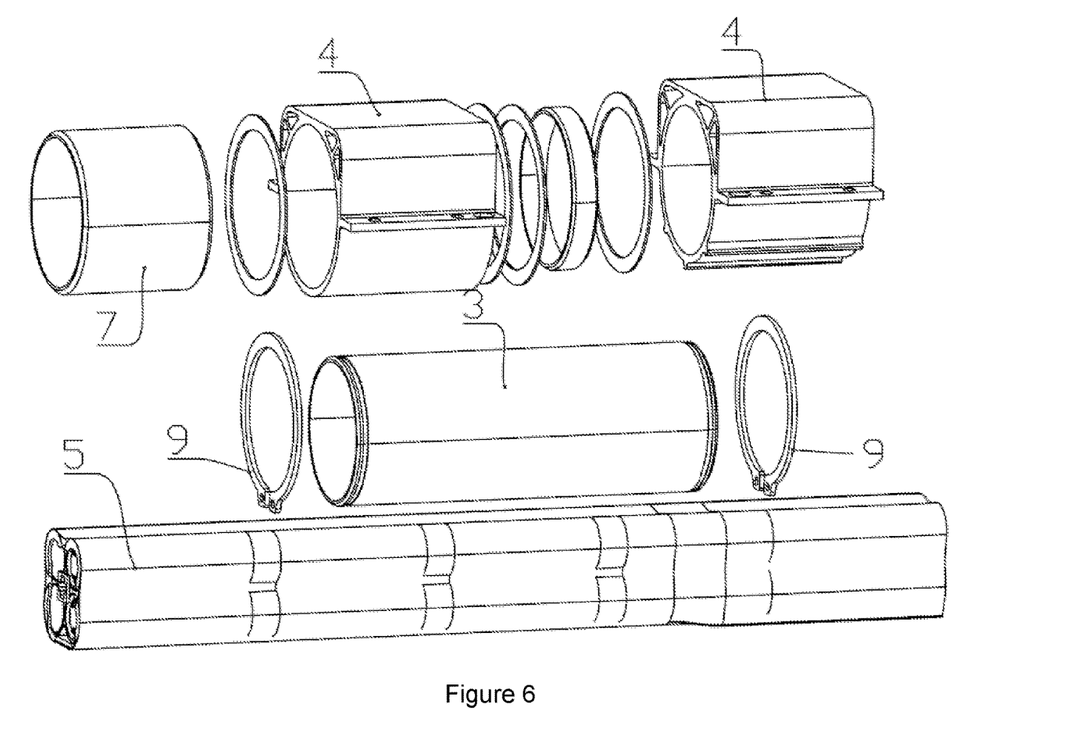
FIG. 6 illustrates an exploded view of the rotating connection member in accordance with various embodiments of the present disclosure.

FIG. 6 illustrates an exploded view of the rotating connection member in accordance with various embodiments of the present disclosure. As shown in FIG. 6, at least one end of the rotating connection member 3 is equipped with a lubricated bearing 7. The lubricated bearing 7 is disposed between the rotating bracket 4 and the rotating connection member 3 as shown in FIG. 6. The lubricated bearing 7 is fixed to the rotating bracket 4. The lubricated bearing 7 can be rotated relative to the rotating connection member 3. One end of the rotating connection member 3 is fixedly connected to the rotating bracket 4.

This technical solution of the present disclosure provides a way to reduce the cost of self-balancing vehicles. A first end of the rotating connection member 3 is fixedly connected to the rotating bracket 4 through strong pressure. As a result, the first end of the rotating connection member 3 and the rotating bracket 4 cannot be rotated relative to each other. A second end of the rotating connection member 3 is equipped with the lubricated bearing 7 as shown in FIG. 6. The lubricated bearing 7 is fixed to the rotating bracket 4. As a result, the lubricated bearing 7 and the rotating bracket 4 cannot be rotated relative to each other. The lubricated bearing 7 and the rotating connection member 3 can be rotated relative to each other. The self-balancing vehicle is controlled and adjusted through the relative rotation between the left vehicle body and the right vehicle body of the self-balancing vehicle. As a result, the control of the self-balancing vehicle can be realized through rotating one side of the vehicle body of the self-balancing vehicle relative to the other side. Therefore, the embodiment shown in FIG. 6 has an advantageous feature. In particular, one side of the rotating connection member 3 is fixedly connected to the rotating bracket 4. The other side of the rotating connection member 3 and the rotating bracket 4 can be rotated relative to each other through the lubricated bearing 7. By using the lubricated bearing 7, the rotation between the rotating connection member 3 and the rotating bracket 4 is smooth. Because the lubricated bearing 7 requires high precision and high manufacturing cost, only one lubricated bearing 7 is used for saving the cost and simplifying the installation process.

The lubricated bearing 7 can reduce maintenance in operation. The maintenance of the lubricated bearing 7 is simple and convenient. The lubricated bearing 7 has a thin-walled structure and light weight, which can reduce the volume of the vehicle. The static and dynamic friction coefficients are similar, thereby ensuring the accuracy of the vehicle. Furthermore, the lubricated bearing 7 can distribute the stress on a wide contact surface to improve the capacity of the bearing. Other advantageous features of the lubricated bearing 7 include good wear performance, a low friction coefficient, a long use life and the like. The lubricated bearing 7 can reduce vibration, attenuate noise and prevent pollution, thereby improving operating conditions. During the operation, a transfer film can be formed to protect the rotating connection member 3 and reduce the processing difficulty of related parts.

Figure 7:
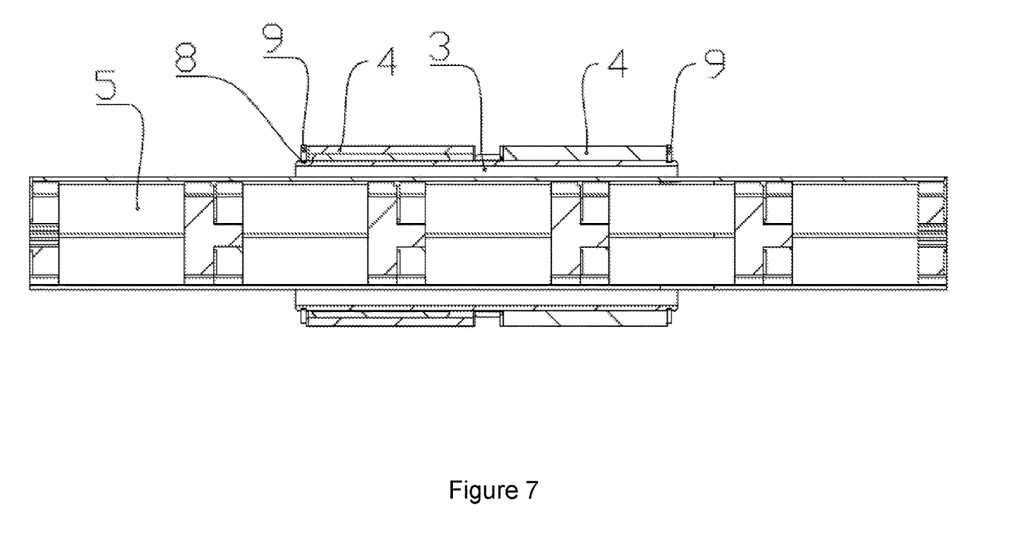
FIG. 7 illustrates is a cross sectional view of the rotating connection member in accordance with various embodiments of the present disclosure.

FIG. 7 illustrates is a cross sectional view of the rotating connection member in accordance with various embodiments of the present disclosure. As shown in FIG. 7, the rotating connection member 3 includes two shaft grooves 8 on the left end and the right end of the rotating connection member 3 respectively. Two circlips 9 are mounted over the shaft grooves 8 respectively. The circlips 9 are on the both ends of the rotating brackets 4 to stop the motion. In particular, the circlips 9 are employed to prevent the rotating connection member 3 from moving axially. Preferably, the circlips 9 may be implemented as C-shaped resilient circlips. The inner diameter of the circlip 9 is slightly smaller than the diameter of the bearing. When the circlip 9 is installed, a clamp is used. The month of the clamp is inserted into the clamp hole of the circlip 9, and the circlip 9 is expanded, and then the circlip 9 is installed over the shaft groove 8.

Figure 3:
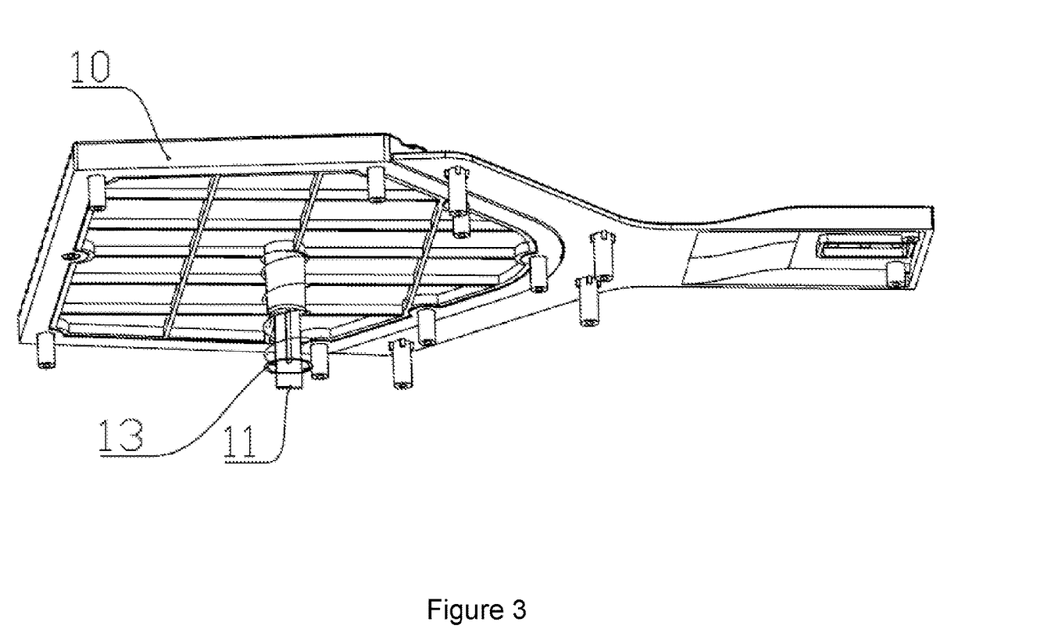
FIG. 3 illustrates is a perspective view of a pedal in accordance with various embodiments of the present disclosure.

FIG. 3 illustrates is a perspective view of a pedal in accordance with various embodiments of the present disclosure. The pedals 10 are installed on the left and right sides of the upper case 1. A sensing device is disposed below at least one of the pedals 10. The sensing device comprises a trigger element 11 connected to the pedal 10. A return spring 13 is placed next to the trigger element 11. As shown in FIG. 3, the return spring 13 is sleeved on the trigger element 11. The detailed description of the return spring 13 will be discussed below with respect to FIG. 4.

Figure 4:
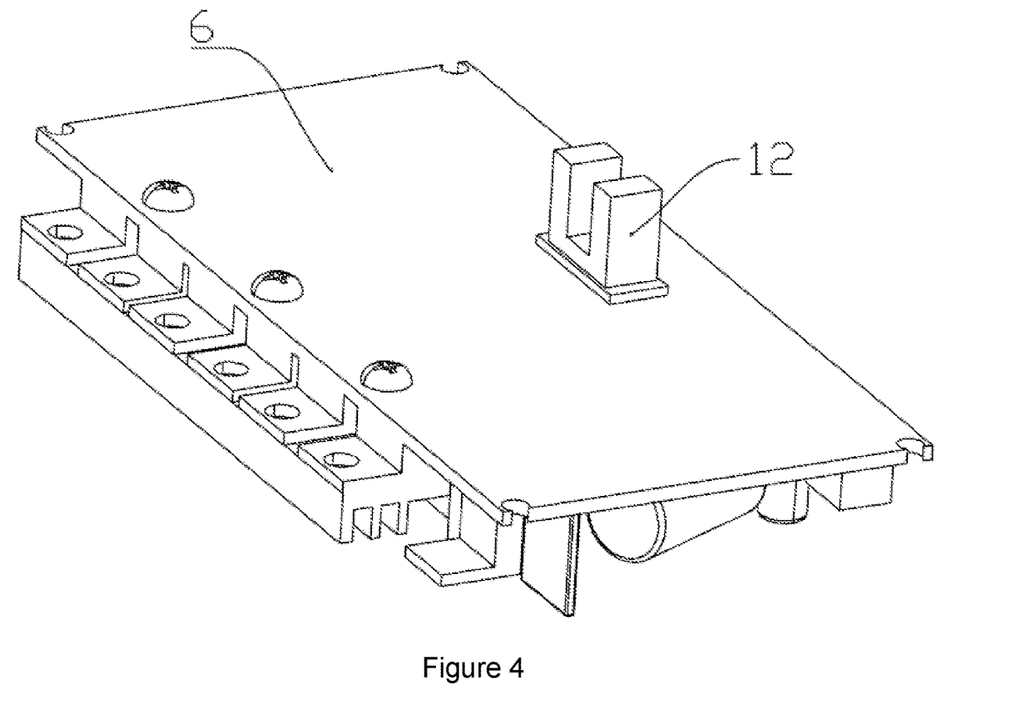
FIG. 4 illustrates is a perspective view of the controller in accordance with various embodiments of the present disclosure.

FIG. 4 illustrates is a perspective view of the controller in accordance with various embodiments of the present disclosure. The sensing device further comprises a photoelectric switch 12. The photoelectric switch 12 is connected to the controller 6 as shown in FIG. 4. The photoelectric switch 12 comprises an opening configured to cooperate with the trigger element 11 shown in FIG. 3.

As shown in FIG. 4, the photoelectric switch 12 has the opening. The photoelectric switch 12 is one type of beam photoelectric switches. The photoelectric switch 12 shown in FIG. 4 is also known as a U-type photoelectric switch, which is an infrared sensor including an infrared emitter and an infrared receiver. The opening width determines the strength of the received signal and the distance of the received signal. The light functions as a medium. The infrared light is received and converted between the light emitter and the light receiver so as to detect the position of the object. The photoelectric switch 12 is a contact-free switch. Less constraint is applied to the object to be detected. In addition, the detection distance is long. The object to be detected can be placed at a long distance (tens of meters). The detection is accurate. This application is very broad.

In operation, when a person is not standing on the pedal 10, the trigger element 11 leaves the U-shaped opening of the photoelectric switch 12 under the action of the return spring 13. When the pedal 10 is stepped on, the pedal 10 is pushed down. As a result of having the pedal 10 pushed down, the trigger element 11 is inserted into the U-shaped opening of the photoelectric switch 12. The trigger element 11 functions as a barrier to the light emission. As a result, the photoelectric switch 12 is turned off. The turned off switch interrupts the control from the controller 6 to the driving wheels, and the driving wheels start to rotate. The self-balancing vehicle starts moving.

When a user leaves the pedal 10, the pedal 10 will return to the natural state under the action of the elastic force of the return spring 13, and the trigger element 11 leaves the U-shaped opening of the photoelectric switch 12 to stop the self-balancing vehicle. There is no mechanical contact during the entire power-on and power-off processes. Therefore, mechanical losses do not occur during the power-on and power-off processes. The parts have a long service life, and the photoelectric switch 12 has high sensitivity and will not run out of control.

The traditional self-balancing vehicle is equipped with an aluminum plate. The four corners of the aluminum plate are provided with sensing devices. The sensing devices include a trigger element and a rubber element. The sensing devices are connected to the controller through the rubber element. The deformation of the rubber element is fed back to the controller. The controller receives the deformation signal indicating a user standing on the self-balancing vehicle. The rubber element is easy to become aged. The rubber element may have deformation fatigue damages after it has been used for a long period of time. The controller cannot sense the deformation and cause the self-balancing vehicle to fail. This greatly reduces the service life of the self-balancing vehicle. In the various embodiments of the present disclosure, the photoelectric switch 12 is employed to replace the rubber element. Only one sensor device is provided under each of the left and right pedals to sensitively detect the user standing on the pedals. The photoelectric switch 12 reduces the cost and prolongs the service life of the self-balancing vehicle. At the same time, the return spring 13 is installed on the trigger element 11. The return spring 13 enables the trigger element 11 to reset in time after the signal is transmitted to the controller 6 through the photoelectric switch 12.

Referring back to FIG. 2, the upper case 1 comprises two pedal mounting openings. The pedals 10 are installed in the mounting openings. The pedals 10 are mounted horizontally on the upper left portion and right portion of the upper case 1. Each pedal 10 includes a foot pedal and a waterproof pressure plate. The waterproof pressure plate is arranged below the foot pedal to ensure the waterproof performance inside the vehicle body. The waterproof pressure plate can help to prevent the controller 6 and the power supply (e.g., batteries) in the vehicle body from being wet and short-circuited, thereby improving the life of the self-balancing vehicle. A number of anti-slip protrusions are formed on the pedal to increase friction and keep the human body standing smoothly.

In operation, after the foot pedal is stressed, a motion trend signal is generated and transmitted to the controller 6 by the rotation signal generated by the pedal 10 for driving the vehicle body to tilt. Preferably, each foot pedal can only handle one foot. The pedaling area of the foot pedal is small, thereby reducing its own gravity and the required cost. In this way, for the vehicle body, the planar coverage of the self-balancing vehicle can be reduced. The reduced size makes the manufacturing process of the vehicle body simpler and the cost lower. The pedals are set inside or between the driving wheels. Such an arrangement makes it easier to control the balance of the self-balancing vehicle. In addition, there is a certain distance between the pedals to ensure the stability of the rider during riding. The pedal on each side transmits a rotation signal to the controller 6, and the controller 6 controls the driving wheels to rotate at different speeds after receiving the rotation signal, making turning or driving more convenient and sensitive. The control principle of the controller 6 is well known, and hence is not discussed herein.

On both sides of the vehicle body, there is a driving wheel. As shown in FIG. 2, a wheel motor 14 is installed in each driving wheel. The wheel motor 14 is used to drive the vehicle body to generate motion. The wheel motor 14 includes a motor shaft 15. The motor shaft 15 is fixed on the foot pedal through a motor shaft pressure plate 16. The motor shaft pressure plate 16 comprises a recess forming a mounting groove downwardly. The mounting grooves are symmetrically on both sides. The mounting grooves comprise a connecting hole connected with the foot pedal. This arrangement has a stable connection, which is easily disassembled. The motor shaft pressure plate 16 functions as a support stop. The force is applied to the motor shaft pressure plate 16 uniformly. The driving wheel has a large wheel body, which can greatly ensure the stability and driving force of the vehicle body. A "wing-shaped" fender is provided between the driving wheel and the pedal. The fender can block muddy water from splashing during driving. On the other hand, the fender is higher than the pedal and plays a blocking role. The fender makes the rider stand more stable. The fender helps to avoid the feet from falling to both sides. Furthermore, the fender functions as a resisting force receiving part when manipulating the self-balancing vehicle. The fender is convenient for the foot to exert force, and the operation is more flexible and convenient.

The above is only a preferred embodiment of the present invention. It should be noted that, for those of ordinary skill in the art, without departing from the technical principles of the present invention, several improvements and replacements can be made. These improvements should also be regarded as the scope of protection of the present invention.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
   a first wheel connected to a left vehicle body comprising a first upper case and a first lower case;
   a second wheel connected to a right vehicle body comprising a second upper case and a second lower case;
   a rotating connection member between the left vehicle body and the right vehicle body;
   a plurality of batteries placed inside the rotating connection member; and
   a controller on at least one of the first upper case and the second upper case.

2. The system of claim 1, wherein:
   a first end of the rotating connection member is surrounded by a first rotating bracket, and wherein the first rotating bracket is fixed to the left vehicle body; and
   a second end of the rotating connection member is surrounded by a second rotating bracket, and wherein the second rotating bracket is fixed to the right vehicle body.

3. The system of claim 1, further comprising:
   a first pedal on the first upper case;
   a second pedal on the second upper case; and
   a sensing device underneath at least one of the first pedal and the second pedal.

4. The system of claim 3, wherein:
the sensing device comprises a trigger element and a photoelectric switch connected to the controller, and wherein the photoelectric switch comprises an opening configured to accommodate the trigger element.

5. The system of claim 4, further comprising:
a return spring sleeved on the trigger element.

6. The system of claim 1, wherein:
at least one terminal of the rotating connection member is equipped with a lubricated bearing, and wherein the lubricated bearing is between a rotating bracket and the rotating connection member, and wherein the lubricated bearing is fixed to the rotating bracket, and the lubricated bearing is rotatable relative to the rotating connection member.

7. The system of claim 6, wherein:
one terminal of the rotating connection member is fixedly connected with the rotating bracket.

8. The system of claim 6, wherein:
the rotating connection member comprises a plurality of shaft grooves, and wherein a plurality of circlips is on the plurality of shaft grooves.

9. The system of claim 1, wherein:
the controller is connected to a wheel motor and a lamp, and wherein the wheel motor includes a motor shaft, and wherein the motor shaft is fixed to the left vehicle body and the right vehicle body through a motor shaft pressure plate.

10. A system comprising:
a first wheel and a second wheel connected to a left vehicle body and a right vehicle body of a vehicle, respectively;
a rotating connection member between the left vehicle body and the right vehicle body, wherein at least one terminal of the rotating connection member is equipped with a lubricated bearing, and one terminal of the rotating connection member is fixedly connected with a rotating bracket;
a battery placed inside the rotating connection member; and
a controller configured to drive the first wheel and the second wheel.

11. The system of claim 10, wherein:
the left vehicle body comprises a first upper case and a first lower case; and
the right vehicle body comprises a second upper case and a second lower case.

12. The system of claim 11, wherein:
the controller is on at least one of the first upper case and the second upper case.

13. The system of claim 11, wherein:
the lubricated bearing is between the rotating bracket and the rotating connection member, and wherein the lubricated bearing is fixed to the rotating bracket, and wherein the lubricated bearing is rotatable relative to the rotating connection member.

14. The system of claim 11, further comprising:
a first pedal and a second pedal on the first upper case and the second upper case, respectively; and
a plurality of sensing devices underneath the first pedal and the second pedal.

15. The system of claim 14, wherein:
a sensing device of the plurality of sensing devices comprises a trigger element connected to one of the first pedal and the second pedal, and a photoelectric switch connected to the controller, and wherein the photoelectric switch comprises an opening configured to accommodate the trigger element after the one of the first pedal and the second pedal is pushed down by a user.

16. A system comprising:
a first wheel and a second wheel connected to a left vehicle body and a right vehicle body of a vehicle respectively, wherein the left vehicle body comprises a first upper case and a first lower case, and the right vehicle body comprises a second upper case and a second lower case;
a rotating connection member between the left vehicle body and the right vehicle body;
a battery placed inside the rotating connection member; and
a controller installed on at least one of the first upper case and the second upper case.

17. The system of claim 16, further comprising:
a first pedal over the first upper case;
a second pedal over the second upper case; and
a plurality of sensing devices underneath the first pedal and the second pedal.

18. The system of claim 17, wherein:
a sensing device of the plurality of sensing devices comprises a trigger element and a photoelectric switch comprising an opening, and wherein the trigger element is inserted into the opening after a user stands on at least one of the first pedal and the second pedal.

19. The system of claim 18, further comprising:
a return spring sleeved on the trigger element, wherein the return spring is configured to reset the trigger element after the user leaves the vehicle.

20. The system of claim 19, wherein:
at least one terminal of the rotating connection member is equipped with a lubricated bearing, and one terminal of the rotating connection member is fixedly connected with a rotating bracket.

* * * * *